(No Model.)
J. G. BARBER.
GATE.
No. 355,293. Patented Jan. 4, 1887.
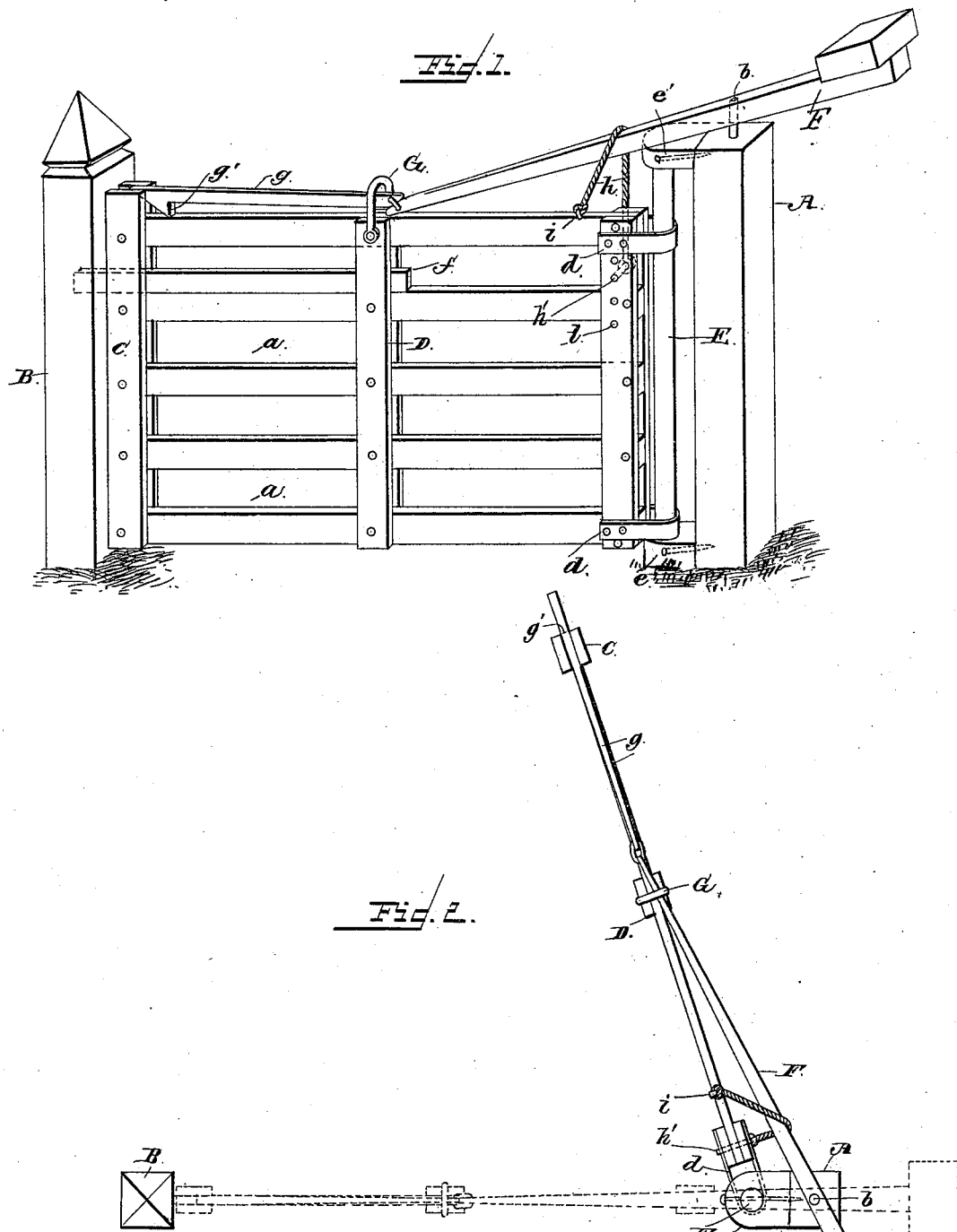

UNITED STATES PATENT OFFICE.

JOSEPH G. BARBER, OF BRODHEAD, WISCONSIN.

GATE.

SPECIFICATION forming part of Letters Patent No. 355,293, dated January 4, 1887.

Application filed June 1, 1886. Serial No. 203,860. (No model.)

*To all whom it may concern:*

Be it known that I, JOSEPH G. BARBER, a citizen of the United States, residing at the village of Brodhead, in the county of Green and State of Wisconsin, have invented certain Improvements in Gates, of which the following is a specification.

My invention relates to an improvement in gates; and it consists in the peculiar construction and combination of devices, that will be more fully set forth hereinafter, and particularly pointed out in the claim.

In the accompanying drawings, Figure 1 is a perspective view of a gate embodying my improvements. Fig. 2 is a top plan view of the same, showing the gate open in full lines and closed in dotted lines.

A represents a post, to the front side of which is secured a vertical rod, E, provided at its lower end with a shoulder, $e$, and at its upper end with a shoulder, $e'$.

C represents a gate, which is of the usual construction, and comprises vertical end and center bars and horizontal rails $a$. This gate is hinged to the vertical rod E by means of straps $d$, that are attached to the rear end of the gate and embrace the said rod, and the gate is free to be raised on the rod, as will be very readily understood.

B represents the post against which the gate closes, and $f$ represents a sliding latch-bar supported on one of the horizontal gate-rails, and adapted to enter a mortised opening in the post B, so as to secure the gate thereto when closed.

F represents a lever, which is loosely pivoted on a pin, $b$, that projects vertically from the top of the post $a$, at the center thereof. The said lever F has its outer end weighted and its inner end attached to the center of the gate by a keeper, G, which projects from the upper edge of the gate.

A rope or chain, $h$, has one end attached to the upper edge of the gate, near the inner end thereof, by a staple, $i$, and the said rope or chain passes over the lever F, and has its opposite end attached to the gate by a pin, $h'$, adapted to enter either of a vertical series of openings, $l$, made in the vertical bars at the inner end of the gate. By this means the gate may be supported at any desired vertical adjustment.

It will be noted that the point on which the lever F is pivoted is in rear of the central or pivotal points from which the gate swings, so that when the latter is opened the inner end of the lever F moves toward the free end of the gate.

$g$ represents a detent-catch, having at its front end a depending shoulder, $g'$. The said catch bears and is adapted to slide upon the top edge of the gate, at the free end thereof, and is attached to the inner end of the lever F, which forms an extension or arm for the catch, and the latter is thereby movable with the said lever.

When the gate is opened, the detent-catch moves outwardly toward the free end thereof, and drops its shoulder $g'$ over the free edge of the gate, thus securing the latter when opened, and preventing it from being blown to a closed position by the wind. In order to close the gate it is first necessary to disengage the detent-catch therefrom.

The weighted lever counterbalances the gate, and thus renders it easy to raise or lower the same on the vertical rod E.

Having thus described my invention, I claim—

The combination of the hinged gate, the lever F, pivoted at a point beyond the pivotal center on which the gate turns, and the sliding detent-catch on the gate connected to the lever F, and movable thereby, for the purpose set forth, substantially as described.

JOSEPH G. BARBER.

Witnesses:
BURR SPRAGUE,
E. R. SPRAGUE.